United States Patent
Soliman et al.

(10) Patent No.: US 7,743,860 B2
(45) Date of Patent: Jun. 29, 2010

(54) HOLDING A HYBRID ELECTRIC VEHICLE ON AN INCLINED SURFACE

(75) Inventors: Ihab S. Soliman, Warren, MI (US); Andrew J. Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 11/869,126

(22) Filed: Oct. 9, 2007

(65) Prior Publication Data

US 2009/0093337 A1    Apr. 9, 2009

(51) Int. Cl.
*B60W 10/08* (2006.01)
(52) U.S. Cl. .................. 180/65.265; 903/930; 477/5
(58) Field of Classification Search ........... 180/65.265, 180/65.275, 65.28, 65.285; 903/930, 946; 701/22; 477/3, 5, 93, 114, 901
See application file for complete search history.

(56) References Cited

U.S. PATENT DOCUMENTS

| | | | |
|---|---|---|---|
| 5,842,534 A * | 12/1998 | Frank | 180/65.25 |
| 6,540,035 B2 * | 4/2003 | Nagano et al. | 180/65.21 |
| 6,590,299 B2 * | 7/2003 | Kuang et al. | 290/40 C |
| 6,758,788 B2 * | 7/2004 | Itou | 477/8 |
| 6,960,152 B2 * | 11/2005 | Aoki et al. | 477/3 |
| 7,395,837 B2 * | 7/2008 | Foster et al. | 137/557 |
| 7,509,202 B2 * | 3/2009 | Scelers | 701/65 |
| 7,516,007 B2 * | 4/2009 | Tamai et al. | 701/70 |

* cited by examiner

*Primary Examiner*—Paul N Dickson
*Assistant Examiner*—John D Walters
(74) *Attorney, Agent, or Firm*—David B. Kelley; MacMillan, Sobanski & Todd, LLC

(57) ABSTRACT

In a powertrain that includes wheels supporting a vehicle, an engine, a first machine able to operate alternately as an electric motor and electric generator, a second machine electric able to operate as an electric motor, and an electric storage battery having a variable state of charge, a method for holding the vehicle stationary on an incline including determining a magnitude of torque at the wheels required to hold the vehicle on the incline, determining whether the state of charge is low or high relative to a reference state of charge, determining whether a temperature of the first machine is low or high relative to a first reference temperature, and whether a temperature of the second machine is low or high relative to a second reference temperature, using the engine and the machines in various combinations to produce the required torque at the wheels.

6 Claims, 15 Drawing Sheets

HOLDING A HYBRID ELECTRIC VEHICLE ON AN INCLINED SURFACE

BACKGROUND OF THE INVENTION

1. Field of the Invention

This invention relates generally to a powertrain for a hybrid electric vehicle (HEV) having an engine and one or more electric machines and, in particular, to controlling torque transmitted to the drive wheels when the vehicle is located on an incline.

2. Description of the Prior Art

A powershift transmission is a geared mechanism that includes no torque converter, but instead employs two input clutches driveably connected to an engine crankshaft. A powershift transmission produces multiple gear ratios in forward and reverse drive and transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle creep condition with an increasing uphill road grade, the vehicle will eventually come to a stand-still condition due to the increased road load. At the point of stand-still for the given road grade, the vehicle is required to be stationary unless the driver tips into the accelerator pedal. While the vehicle is "holding" it should not roll backward at any point unless the road grade further increases beyond the stand-still point. The road grade at which vehicle stand-still ("hill-hold") should occur is specified as a vehicle performance requirement and can vary by manufacturer or vehicle model.

In a conventional vehicle equipped with a powershift transmission, because there is no torque converter, the necessary engine torque for vehicle hill-hold is transferred to the vehicle wheels by slipping the appropriate input clutch.

The vehicle can be held on a hill using a powershift transmission for only a limited period due to degradation in clutch torque transfer capacity as the thermal limits of the clutch are reached while the clutch is slipping. The thermal capacity of the clutch also limits hill-holding to lower road grades.

If the vehicle rolls back during a hill-hold condition due to degrading clutch torque transfer with increasing clutch temperature, the vehicle operator will eventually tip-in to the accelerator pedal or begin using the wheel brakes to keep vehicle stationary on the hill.

Furthermore, the vehicle can roll-back when driver tips-in to the accelerator pedal when transitioning from a hill-hold condition to a forward moving condition on a grade.

When the operator tips-in to accelerator pedal in order to keep the vehicle in a hill-hold, the required clutch torque capacity is increased while the vehicle is stopped and the clutch is slipping, which degrades clutch durability.

In a hybrid electric vehicle equipped with a powershift transmission, vehicle hill-hold can be even more challenging when considering the added powertrain operating modes and additional subsystems. For example, overheating the electric machines can lead to loss of hill-hold capability and vehicle rollback. Furthermore, during engine shutdown conditions, hill-hold capability is limited due to the electric machine torque limitations. Moreover, vehicle hill-hold capability may be transiently lost during transitions among the powertrain operating modes of the HEV.

A need exists in the industry for a control strategy that uses additional power or torque sources and the function of the transmission to provide maximum vehicle hill-hold performance without damaging or reducing the life of the various powertrain actuators, i.e. engine, electric machines and transmission.

SUMMARY OF THE INVENTION

In a powertrain that includes wheels supporting a vehicle, an engine, a first machine able to operate alternately as an electric motor and electric generator, a second machine able to operate as an electric motor and electric generator, and an electric storage battery having a variable state of charge, a method for holding the vehicle stationary on an incline including determining a magnitude of torque at the wheels required to hold the vehicle on the incline, determining whether the state of charge is low or high relative to a reference state of charge, determining whether a temperature of the first machine is low or high relative to a first reference temperature, and whether a temperature of the second machine is low or high relative to a second reference temperature, using the engine and the machines in various combinations to produce the required torque at the wheels.

The control method provides vehicle hill-holding and maximizes the length of the hill-holding period by limiting electric machine overheating and using the available electric machines when needed and by limiting excessive slipping of the transmission input clutches.

The control method provides vehicle hill-holding in both forward and reverse drive directions without requiring the vehicle operator to tip into the accelerator or brake pedals.

The control method provides continuous vehicle hill-holding during transitions between the various HEV powertrain operating modes.

The control method takes advantage of transmission torque multiplication and the ability to fully engage the transmission input clutch during engine shutdown conditions.

It reduces the torque required to be produced by electric machines while providing hill-hold function, and it is applicable to any hybrid electric vehicle (HEV) powertrain configuration that includes a fixed-ratio transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
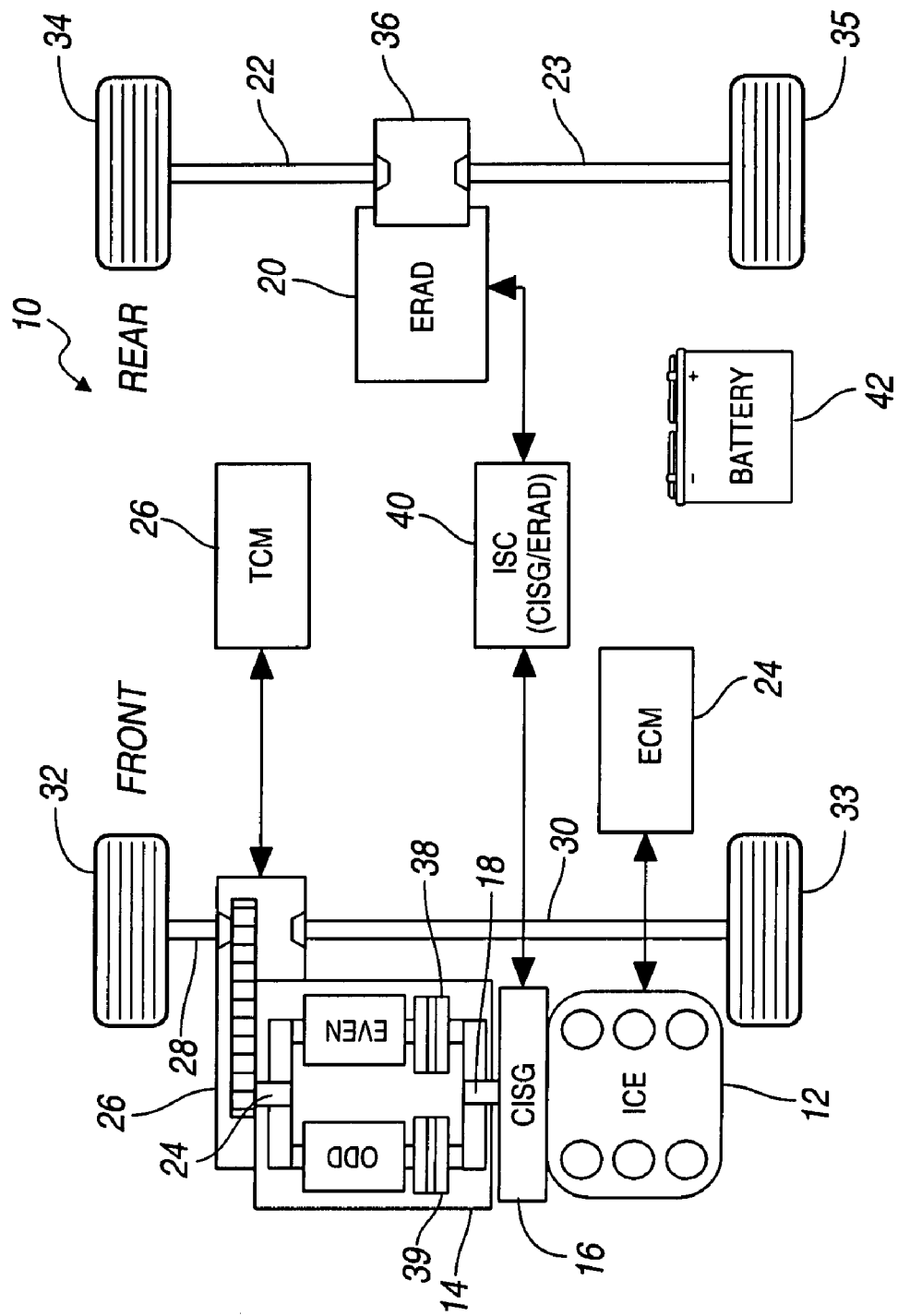
FIG. 1 is a schematic diagram showing an automotive vehicle powertrain for a hybrid electric vehicle.
Figure 2:
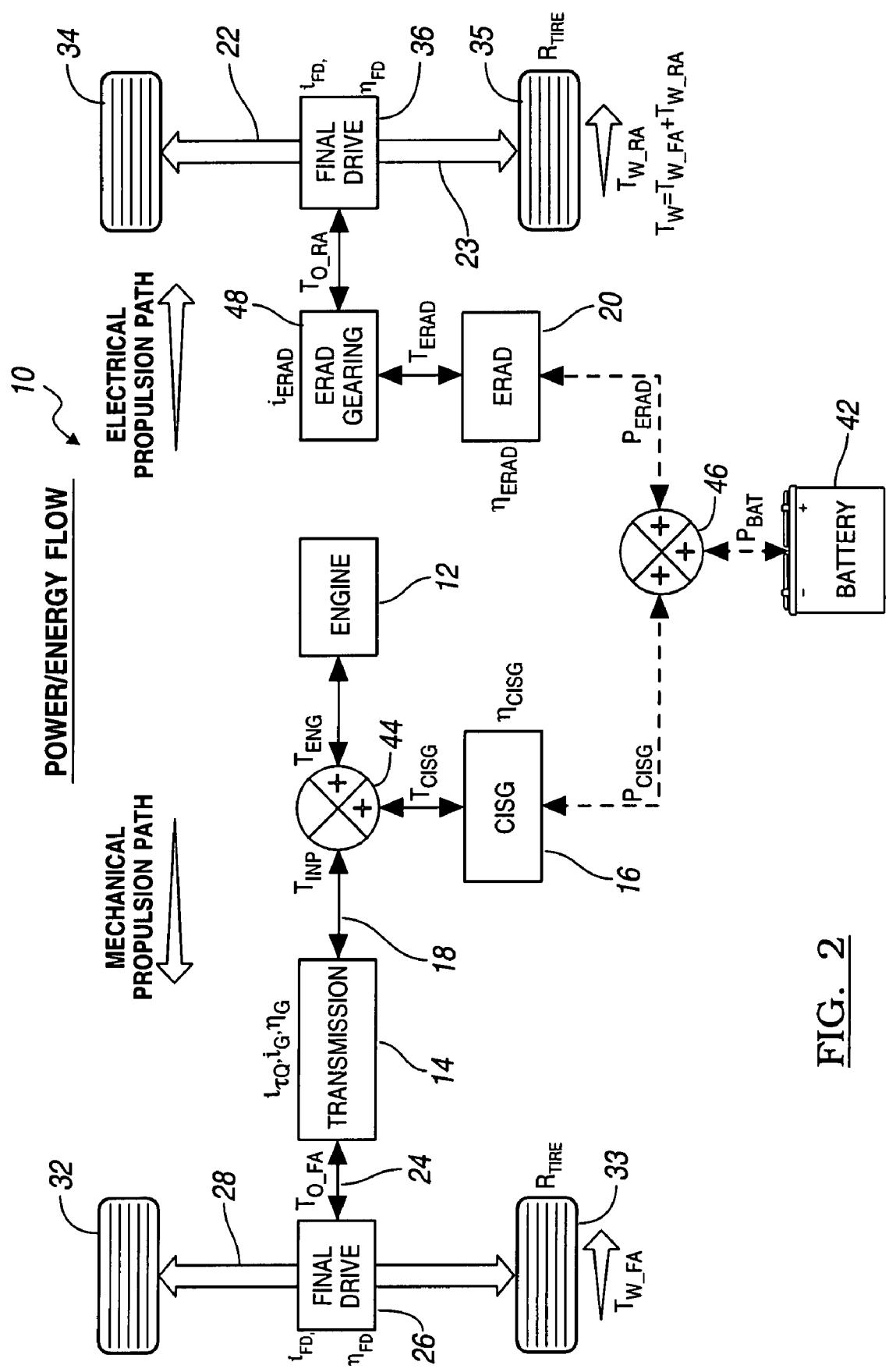
FIG. 2 a schematic diagram showing additional details of the powertrain of FIG. 1.

Referring first to FIGS. 1 and 2, the powertrain 10 configuration includes a first power source such as an internal combustion engine, a diesel engine or a gasoline engine; a power transmission 14 driveably for producing multiple forward and reverse gear ratios, such as a wet-clutch powershift transmission; an electric machine 16 driveably connected to the engine crankshaft and transmission input 18, such as a crankshaft-integrated starter/generator (CISG) for providing starter/generator capability; and an additional electric machine 20 driveably connected to the rear axles 22,23 such as a electric rear axle drive (ERAD), for providing additional propulsion capability in either an electric drive or hybrid drive mode. The transmission output 24 is connected through a final drive unit and differential mechanism 26 to the front axles 28, 30, which drive the front wheels 32, 33, respectively. ERAD 20 drives the rear wheels 34, 35 through ERAD gearing 48, a differential mechanism 36, rear axles 22, 23 and wheels 34, 35.

An electronic engine control module (ECM) 24 controls operation of engine 12. An electronic transmission control module (TCM) 26 controls operation of transmission 14 and the input clutches 38, 39. An integrated starter controller (ISC) 40 controls operation of CISG 16, ERAD 20 and the system for charging an electric storage battery 42, which is electrically coupled to the electric machines 16, 20.

FIG. 2 shows the power and energy flow paths from the power sources 12, 16, 20 to the load at the vehicle wheels 32-35. Power produced by engine 12 and power produced by CISG 16 is combined at 44 and is transmitted to the transmission input 18. Electric power produced by both electric machines 16, 20 is combinable at 46 for charging the battery 42, or is transmitted from the battery to the electric machines. Mechanical power produced by ERAD 20 is transmitted through ERAD gearing 48 to the load at the rear wheels 34, 35 through the rear final drive 36.

Referring now to FIGS. 3-12, powertrain 10 can operate in each of ten states or modes under control of the hill-hold control strategy, as summarized in Table 1.

TABLE 1

| HEV Hill-Hold Mode | Description | Engine | Transmission | | CISG | ERAD |
| | | | Clutch | Gearbox | | |
| --- | --- | --- | --- | --- | --- | --- |
| HH 1: Engine | Engine Only (conventional HH) | On | slipping | In gear | shutdown | shutdown |
| HH 2: Parallel 1 | Engine & ERAD (rear motor assist) | On | slipping | In gear | shutdown | motoring |
| HH 3: Parallel 2 | Engine & CISG (front motor assist) | On | slipping | In gear | motoring | shutdown |
| HH 4: Parallel 3 | Engine & CISG, ERAD (f/r motor assist) | On | slipping | In gear | motoring | motoring |
| HH 5: Series | Engine & ERAD, transmission neutral | On | off | Neutral | generating | motoring |
| HH 6: Electric 1 | ERAD only | Off | off | Neutral | shutdown | motoring |
| HH 7: Electric 2 | CISG & transmission fully engaged | Off | engaged | in gear | motoring | shutdown |
| HH 8: Electric 3 | CISG, ERAD & trans. fully engaged | Off | engaged | in gear | motoring | motoring |
| HH 9: Parallel 4 | Positive split w/ engine & ERAD | On | slipping | in gear | generating | motoring |
| HH 10: Engine w/ charging | Engine drive w/ CISG charging | On | slipping | in gear | generating | shutdown |

Figure 3:
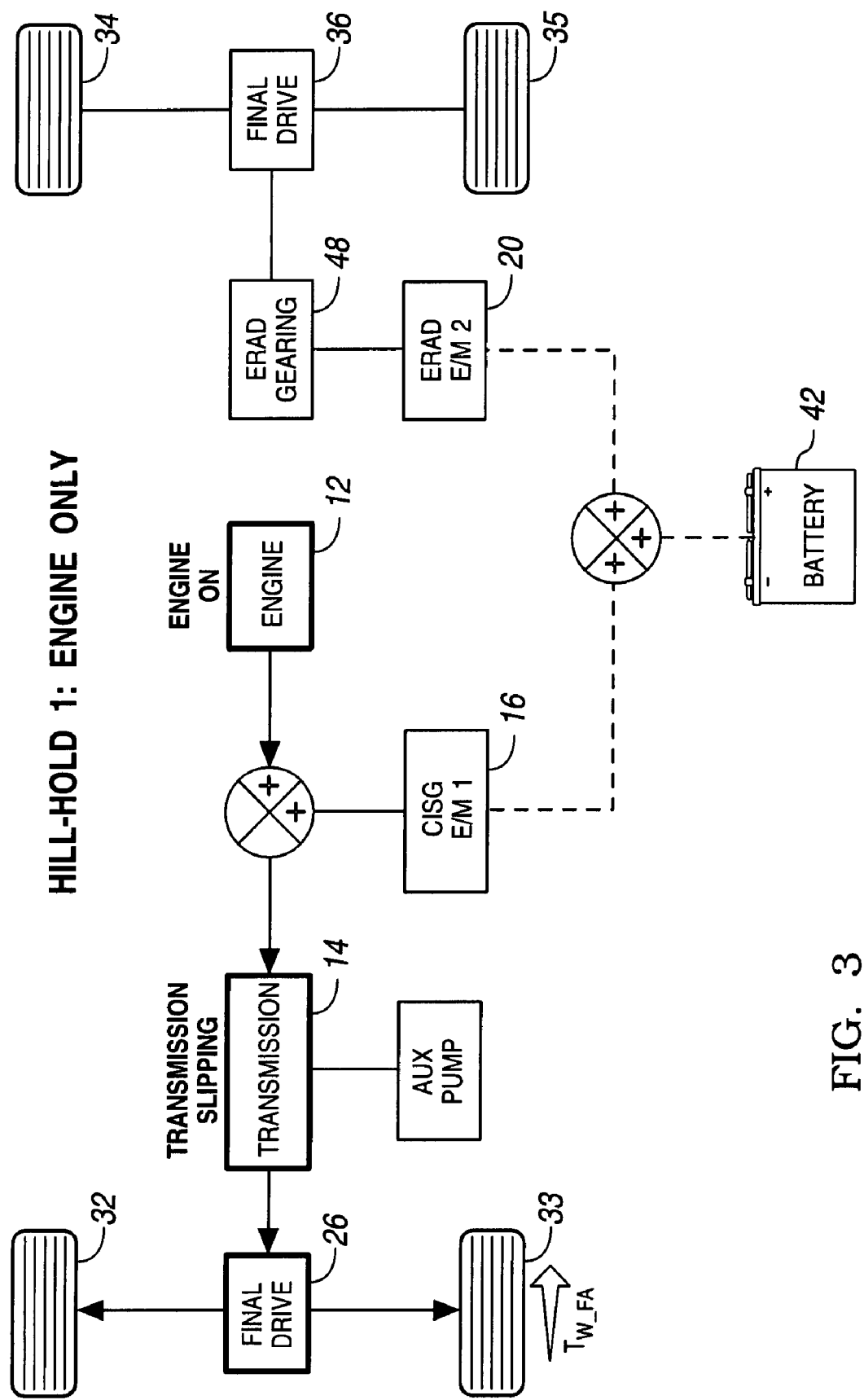
FIGS. 3-12 are schematic diagram showing the power flow in the powertrain of FIG. 1 when operating in the first through tenth modes, respectively.

In the first operating mode, as FIG. 3 illustrates, engine 12 alone produces power, the subject input clutch 38, 39 is slipping, a gear of transmission 14 is engaged, CISG 16 is shutdown, and ERAD 20 is shutdown. The subject input clutch 38, 39 is the clutch associated with the gear in which the transmission is operating while holding the vehicle on an incline. Torque from engine 12 is transferred to the wheels 32, 33 while slipping the subject input clutch in order to provide vehicle hill-hold.

Figure 4:
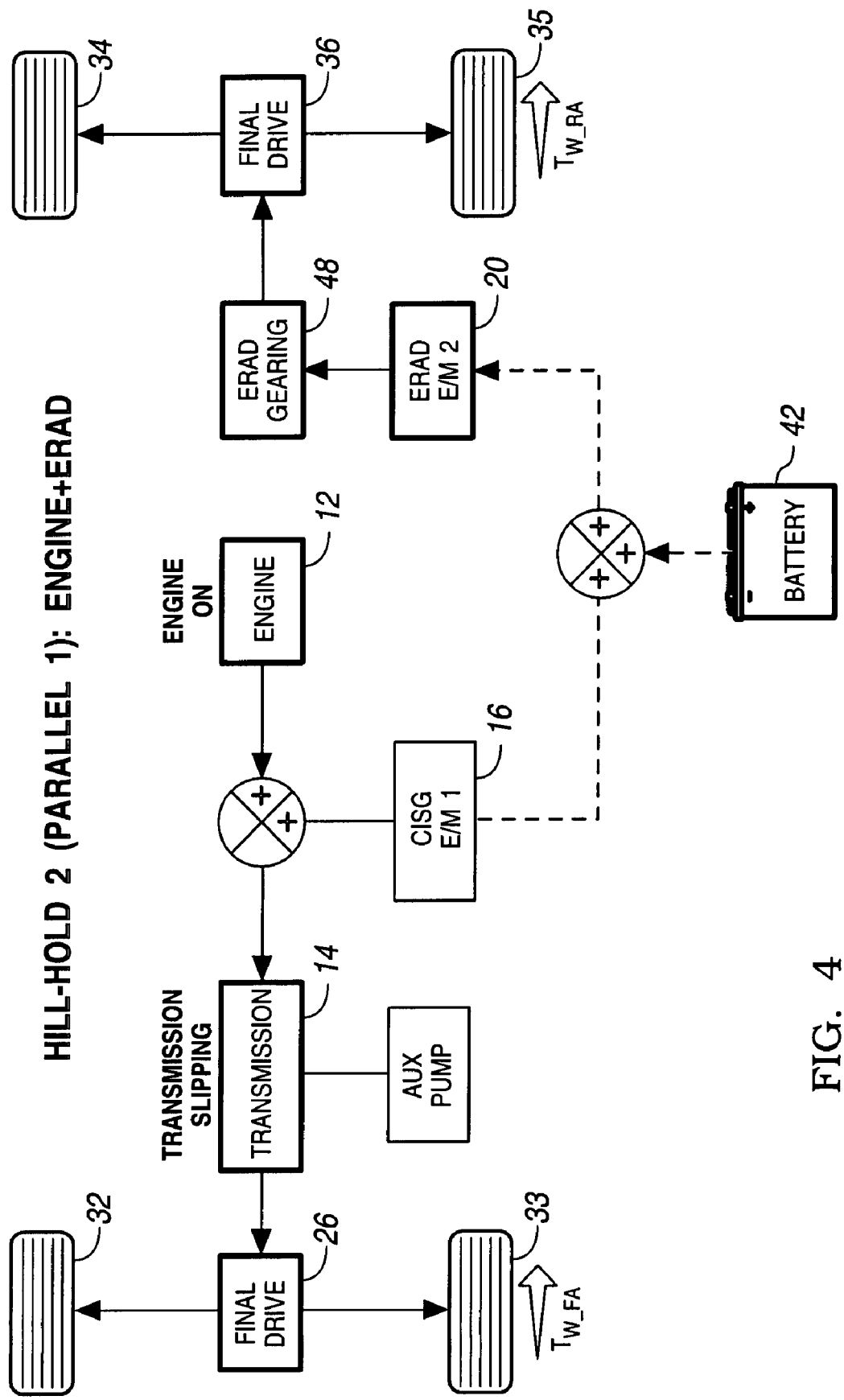

In the second operating mode, as FIG. 4 illustrates, engine 12 produces power to drive the wheels 32,33, the subject input clutch 38, 39 is slipping, a gear of transmission 14 is engaged, CISG 16 is shutdown, and ERAD 20 is motoring, i.e., operating as an electric motor and driving the wheels 34, 35 through the ERAD gearing 48. Electric power is supplied to ERAD 20 from battery 42.

Figure 5:
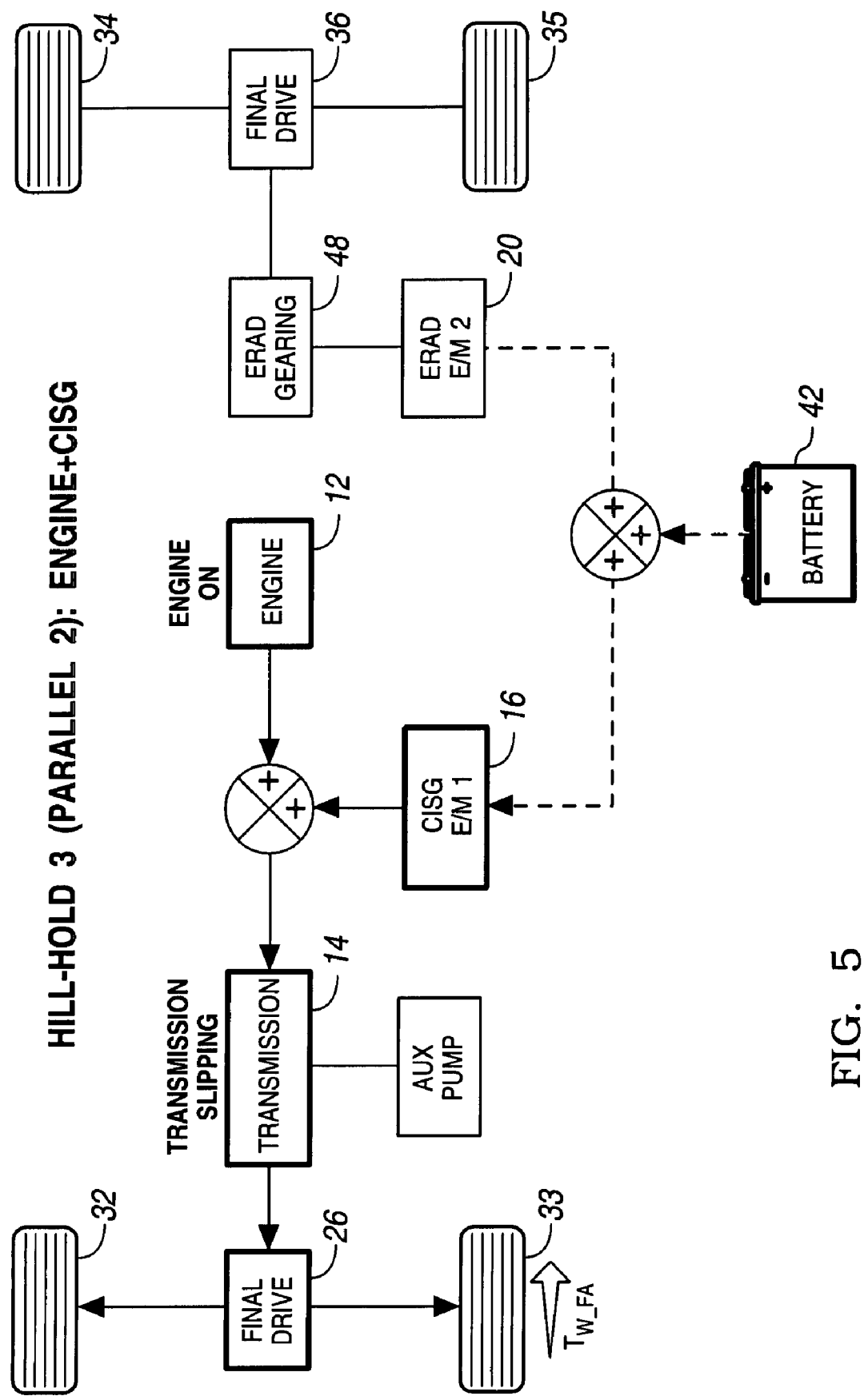

In the third operating mode, as FIG. 5 illustrates, engine 12 produces power, the subject input clutch 38, 39 is slipping, a gear of transmission 14 is engaged, CISG 16 is operating as a motor and producing power to drive the wheels 32, 33 through the transmission, and ERAD 20 is shutdown. Electric power is supplied to CISG 16 from battery 42.

Figure 6:
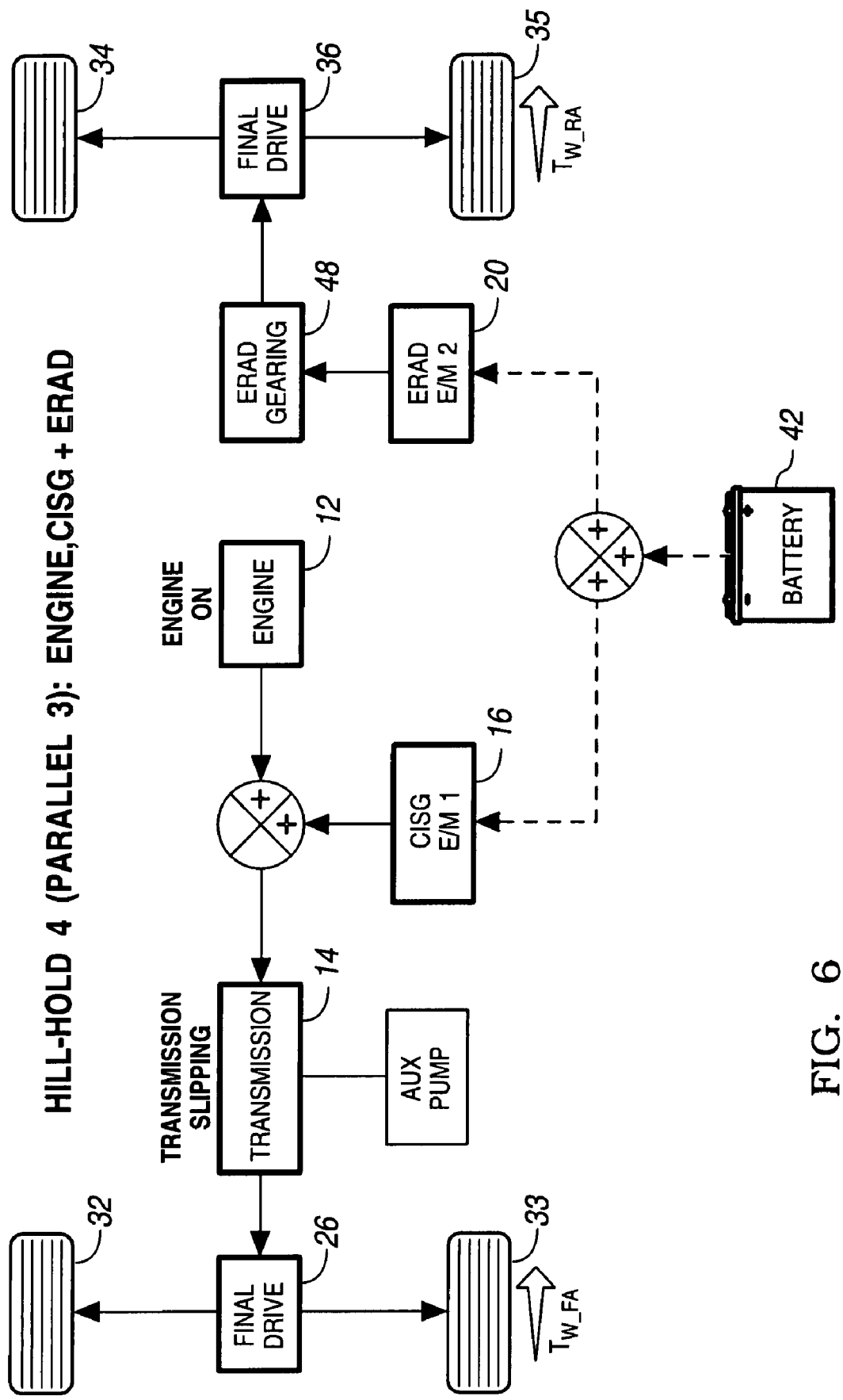

In the fourth operating mode, as FIG. 6 illustrates, engine 12 produces power, the subject input clutch 38, 39 is slipping, a gear of transmission 14 is engaged, CISG 16 is motoring and driving wheels 32, 33 through the transmission, and ERAD 20 is motoring and driving the wheels 34, 35 through the ERAD gearing 48. Electric power is supplied to CISG 16 and ERAD 20 from battery 42.

Figure 7:
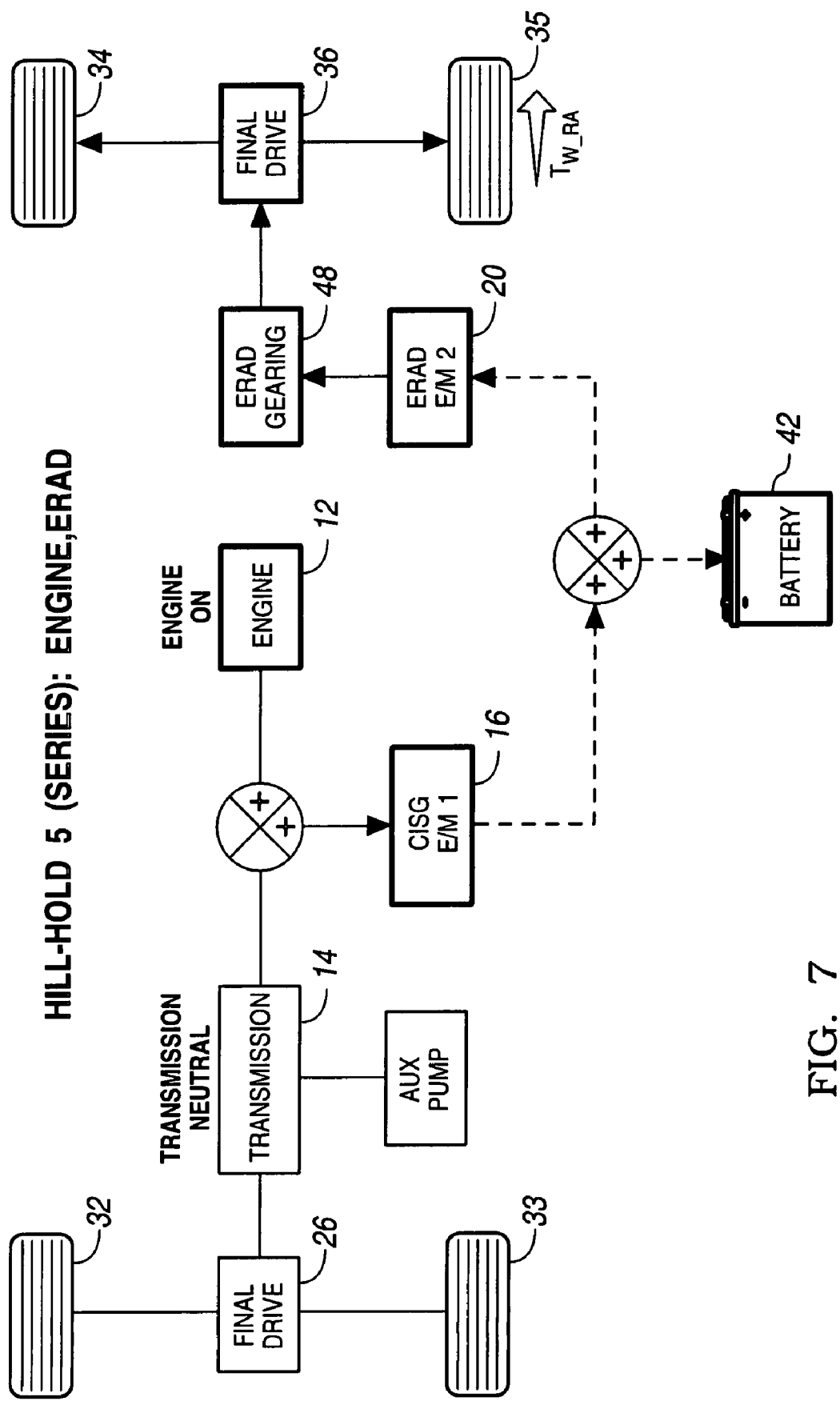

In the fifth operating mode, as FIG. 7 illustrates, engine 12 produces power, the subject input clutch 38, 39 is off, i.e., fully disengaged, no gear of the transmission 14 is engaged, CISG 16 is generating electric power, and ERAD 20 is motoring and driving the wheels 34, 35 through ERAD gearing 48. The engine drives CISG 16, which produces electric power that is supplied to ERAD 20, or battery 42, or both the ERAD and battery.

Figure 8:
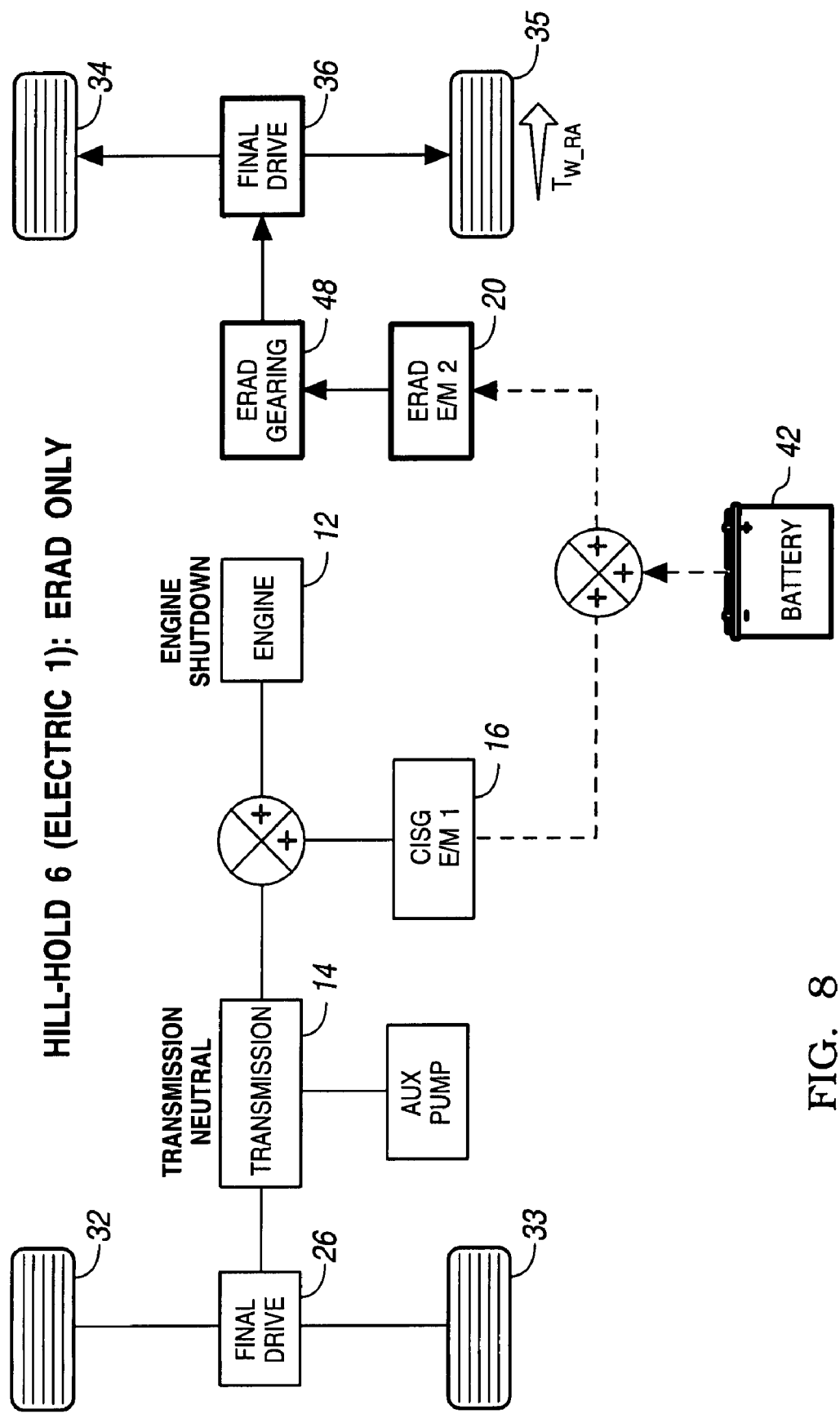

In the sixth operating mode, shown in FIG. 8, engine 12 is shutdown, the subject input clutch 38, 39 is fully disengaged, no gear of the transmission 14 is engaged, CISG 16 is shutdown, and ERAD 20 is motoring and driving the wheels 34, 35 through ERAD gearing 48. Electric power is supplied to ERAD 20 from battery 42.

Figure 9:
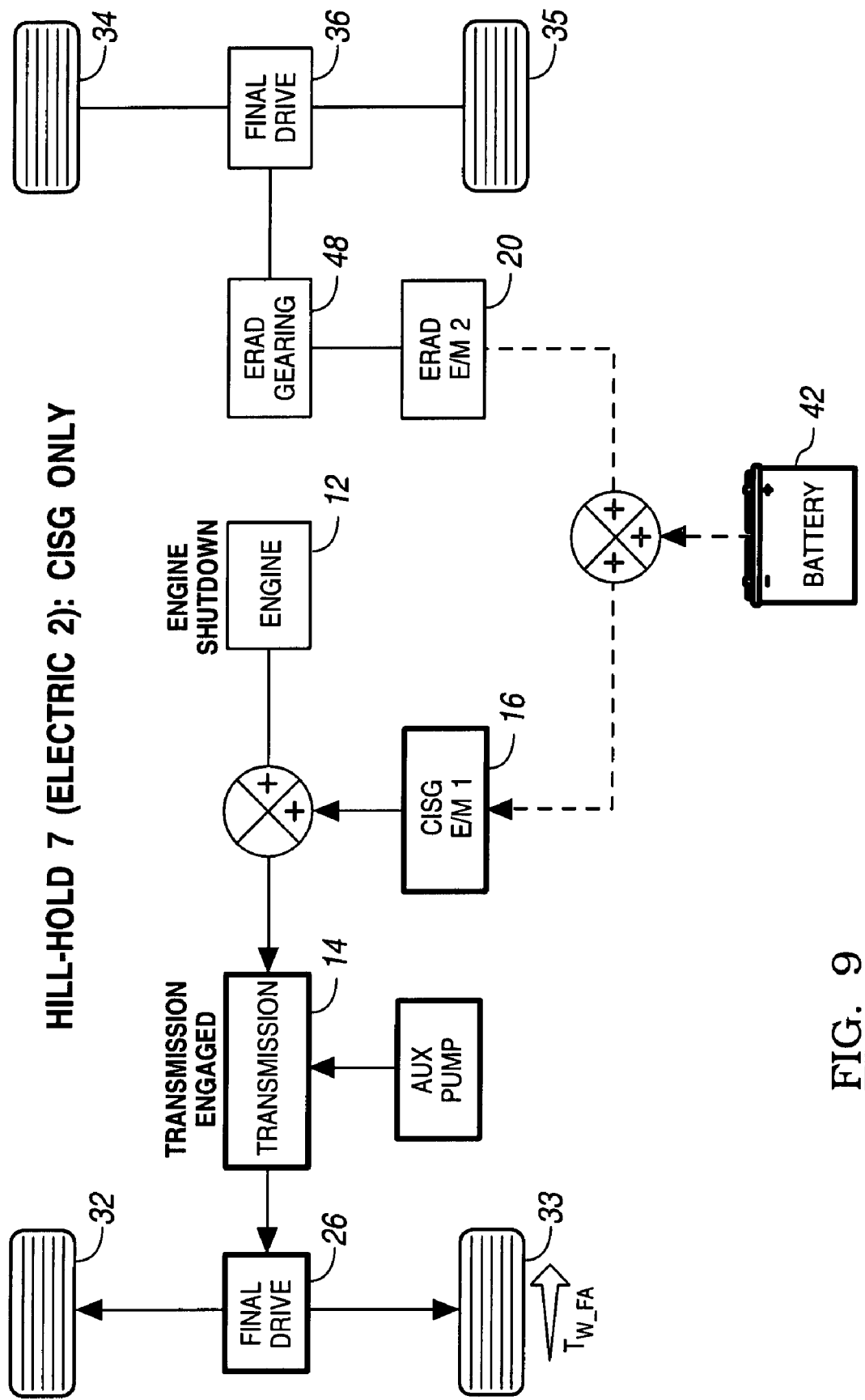

In the seventh operating mode, shown in FIG. 9, engine 12 is shutdown, the input clutches 38, 39 is engaged, a gear of the transmission 14 is engaged, CISG 16 is motoring, and ERAD 20 is shutdown. CISG 16 drives wheels 32, 33 through an input clutch 38 or 39 and transmission 14. Electric power is supplied to CISG 16 from battery 42.

Figure 10:
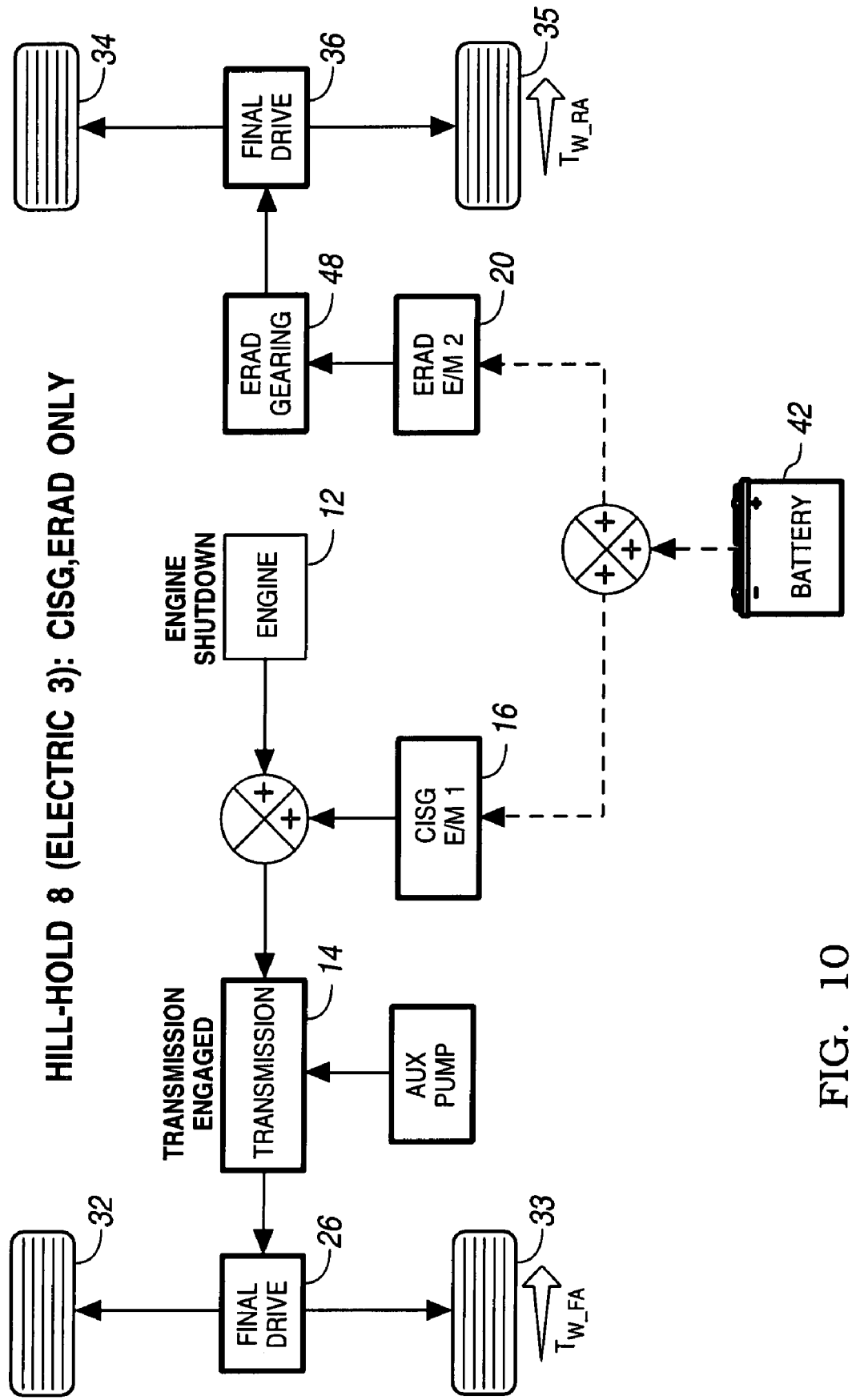

In the eighth operating mode, shown in FIG. 10, engine 12 is shutdown, the subject input clutch 38, 39 is engaged, a gear of the transmission 14 is engaged, CISG 16 is motoring, and ERAD 20 is motoring. CISG 16 drives wheels 32, 33 through the subject clutch 38, 39 and transmission 14. ERAD 20 drives wheels 34, 35 through ERAD gearing 48. Electric power is supplied to CISG 16 and ERAD 20 from battery 42.

Figure 11:
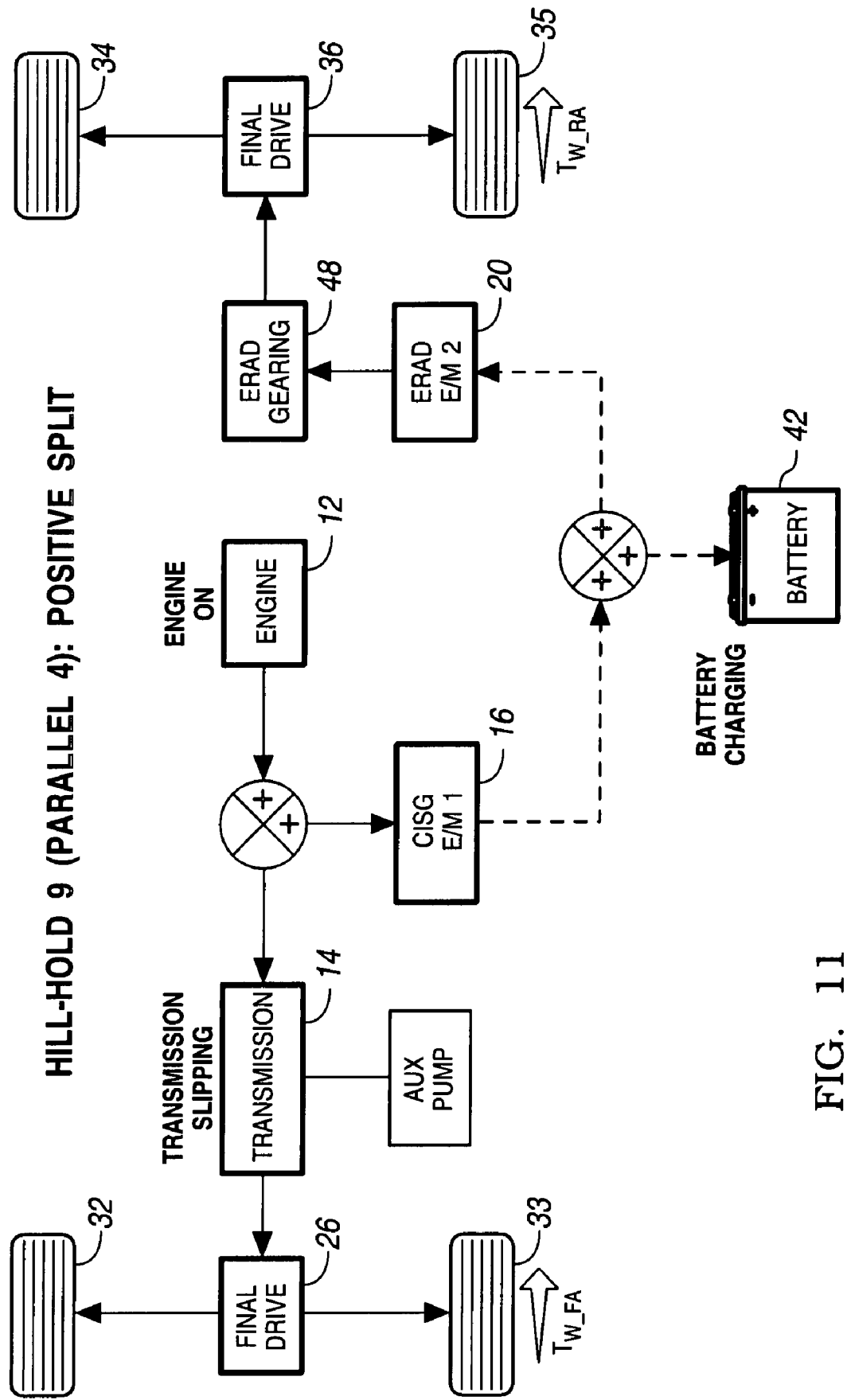

In the ninth operating mode, shown in FIG. 11, engine 12 is producing power, the subject input clutch 38, 39 is slipping, a gear of the transmission 14 is engaged, CISG 16 is generating electric power, and ERAD 20 is motoring and driving wheels 34, 35 through ERAD gearing 48. Engine 14 both drives wheels 32, 33 through the subject clutch 38 or 39 and transmission 14 and drives the CISG. Electric power produced by the CISG is supplied to battery 42, or ERAD 20 or both the ERAD and battery.

Figure 12:
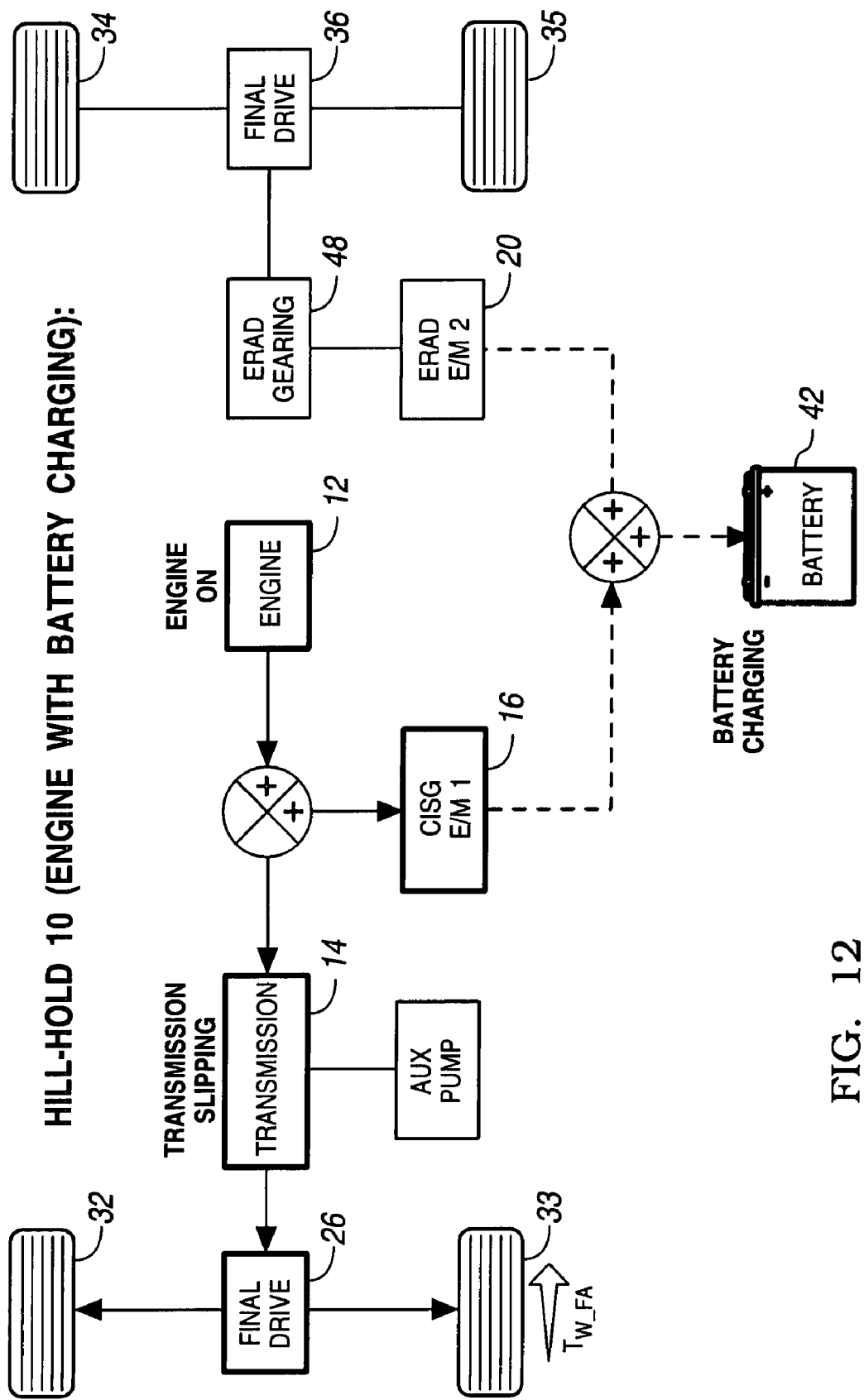

In the tenth operating mode, shown in FIG. 12, engine 12 is producing power, the subject input clutch 38, 39 is slipping, a gear of the transmission 14 is engaged, CISG 16 is generating electric power, and ERAD 20 is shutdown. Engine 14 drives wheels 32, 33 through the subject clutch 38, 39 and transmission 14. Electric power produced by the CISG is supplied to battery 42.

The control strategy & algorithm flow chart for the HEV Hill-Hold is shown in Table 2. In order to select the appropriate hill-hold operating mode, the control strategy will use a priority scheme based on major inputs such as the battery SOC, temperatures of the machines 16, 20, and torque capabilities of the electric machines.

Figure 13:
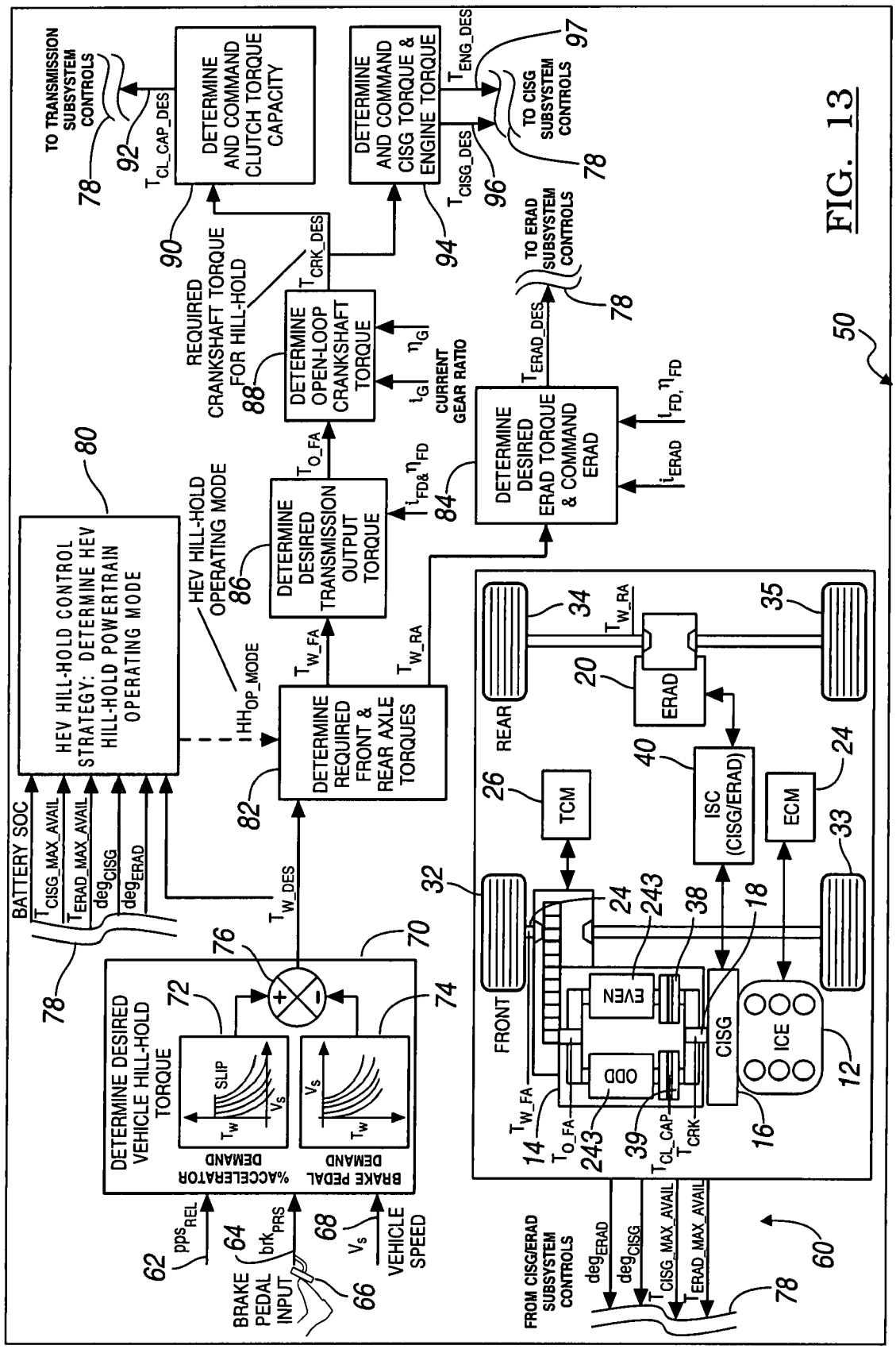
FIG. 13 is a schematic diagram illustrating a hill-hold controller.

FIG. 13 illustrates a hill-hold controller 50 including an electronic microprocessor, accessible to electronic memory containing stored functions, variables, and control algorithms, such as those described with reference to FIGS. 3-12 and 14, and electronic signals produced by various sensors representing operating parameters and variables of the vehicle, engine 12, CISG 16, ERAD 20, transmission 14, input clutches 38, 39, ERAD gearing 48 and final drive 26, front and rear differentials 36, such as CISG and ERAD temperature sensors, a vehicle speed sensor, accelerator pedal position sensor, and brake pressure sensor. The microprocessor executes the algorithms and produces control commands to which the CISG 16 and ERAD 20 respond by producing torque, and the transmission 18 responds by engage and disengaging input clutches 38, 39 and alternately engaging a forward gear and reverse gear.

The vehicle operator's demand for wheel torque is represented by the degree to which the accelerator pedal 62 and brake pedal 66 are depressed. An electronic signal, $pps_{REL}$, representing the accelerator pedal position 62, produced by a sensor in response to depression of the accelerator pedal; an electronic signal, $brk_{PRS}$, representing the brake pressure 64 produced by a sensor in response to depressing the brake pedal 66; and an electronic signal representing the current vehicle speed 68 produced by a shaft speed sensor, are received as input by a desired vehicle hill-hold torque function 70. Function 70 accesses in electronic memory a first function 72, which produces a desired wheel torque when indexed by vehicle speed 68 and accelerator pedal position 62, and a second function 72, which produces a desired wheel torque indexed by vehicle speed and brake pressure 64. At 76, the magnitude of the current desired wheel torque $T_{W\_DES}$ currently required for hill-holding the vehicle is produced from the output produced by functions 72 and 74. It is important to note that the vehicle should hill-hold without requiring the vehicle operator depressing the accelerator pedal to demand additional wheel torque i.e. without accelerator pedal tip-in. Also note that when both accelerator and brake pedals are not depressed, the desired wheel torque will be positive and will be reduced with increasing vehicle speed to provide hill-hold. On level ground with no pedal inputs, this positive desired wheel torque provides vehicle creep.

The temperature and available torque magnitudes determined at 60 and the desired hill-hold wheel torque determined at 76 are supplied as input via a data bus 78 to a HEV hill-hold control strategy 80, which determines the correct hill-hold operating mode $HH_{OP\_MODE}$. The desired torques $T_{W\_FA}$, $T_{W\_RA}$ of the front axle 28, 30 and rear axle 22, 23 are determined respectively at 82 upon reference to the correct hill-hold operating mode $HH_{OP\_MODE}$ and current net desired wheel torque $T_{W\_DES}$.

The desired ERAD torque is determined at 84 upon reference to the desired rear axle torque, and a command for the desired ERAD torque is carried on bus 78 to the ERAD control 40, which responds to the command by regulating the magnitude of electric current to ERAD 20 to the current that produces the desired ERAD torque. Similarly, the desired transmission output torque $T_{O\_FA}$ is determined at 86 upon reference to the desired front axle torque $T_{W\_FA}$.

The desired transmission output torque $T_{OFA}$ and the transmission gear ratio $i_G$ produced by the current gear are used by a function 88 to determine the required hill-hold crankshaft torque $T_{CRK\_DES}$.

The torque capacity of the input clutch 38, 39 associated with the current transmission gear ratio $i_G$ is determined at 90 from the required hill-hold crankshaft torque $T_{CRK\_DES}$. A command $T_{CL\_CAP\_DES}$ 92 for the torque capacity of the relevant input clutch 38, 39 issues, and the TCM 26 controls the input clutch torque to achieve the commanded torque capacity $T_{CL\_CAP\_DES}$.

The desired engine, $T_{ENG\_DES}$, and CISG torques $T_{CISG\_DES}$ are determined at 94 from the required hill-hold crankshaft torque $T_{CRK\_DES}$. A command 96 to produce the desired CISG torque is carried on bus 78 to the ISC 40, which responds to the command 96 by controlling the magnitude of electric current supplied to the CISG 16 such that the desired CISG torque is produced. A command 97 issues to produce the desired engine torque issues, and the ECM 24 controls the engine torque to achieve the commanded torque.

Figure 14:
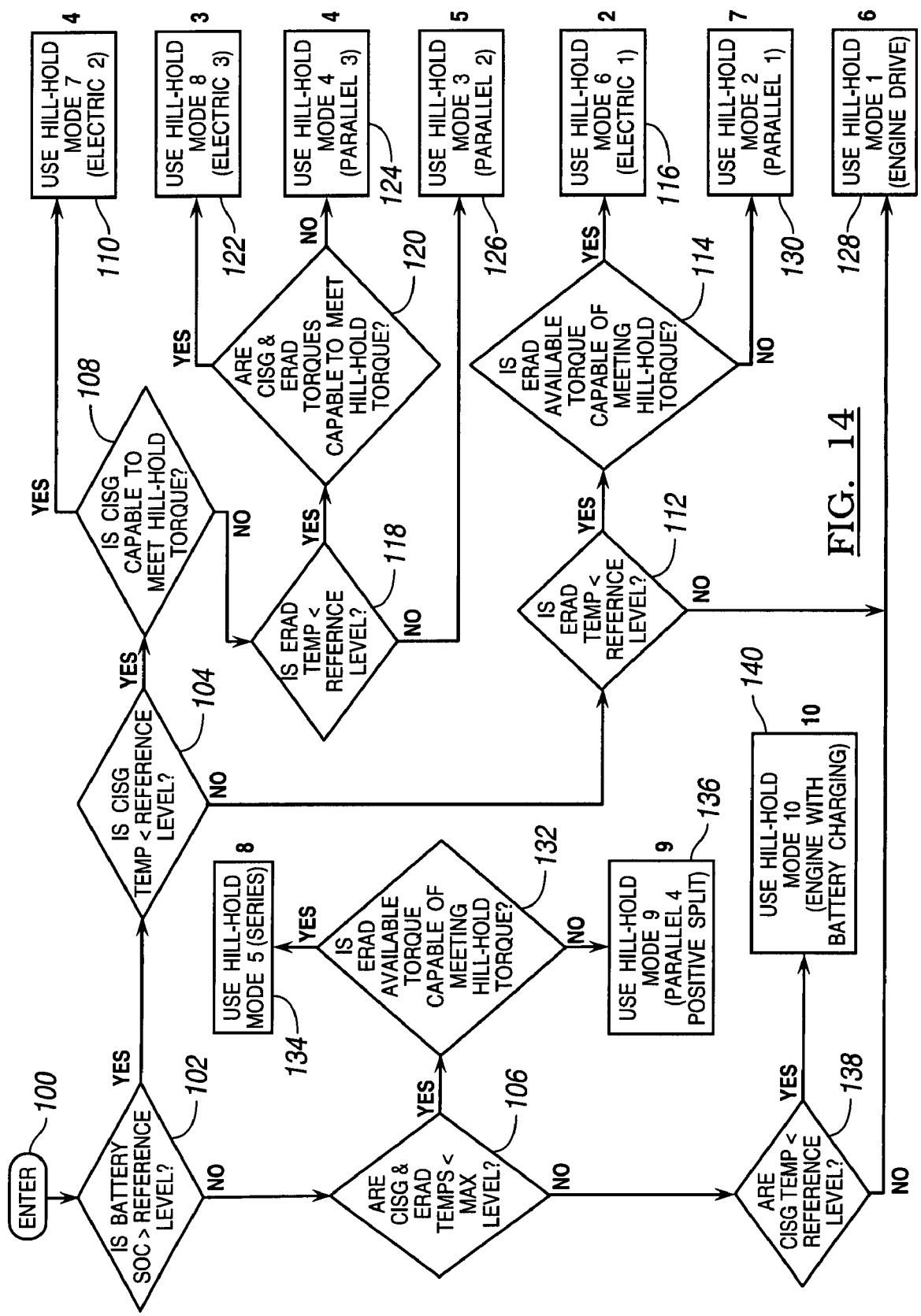
FIG. 14 is a diagram illustrating a vehicle hill-hold control algorithm.

In order to select the appropriate hill-hold operating mode or state, the control strategy uses a priority technique on important conditions such as the battery state of charge (SOC), ERAD temperature CISG temperatures, and torque capabilities of the electric machines, such as that set forth in FIG. 14 and Table 2, in which it is assumed that the state of charge of battery 42 has not reached a reference magnitude at which the engine is restarted automatically.

If the test at 104 is false, indicating that CISG 16 has reached its thermal limit and cannot be used to hill-hold the vehicle, control passes to 112 where a test is made to determine whether the temperature of ERAD 20 is less than a reference temperature.

TABLE 2

| HEV Hill-Hold Mode | Conditions Used |
|---|---|
| HH 1: Engine | Battery SOC below allowable limit & CISG max temperature reached |
|  | Battery SOC ok, but CISG & ERAD reached max temperature limits |
| HH 2: Parallel 1 | Battery SOC ok |
|  | CISG max temperature reached, ERAD temp ok |
|  | ERAD available max torque ALONE not capable for hill-hold, can only provide hill-hold assist |
| HH 3: Parallel 2 | Battery SOC ok |
|  | ERAD max temperature reached, CISG temp ok |
|  | CISG available max torque ALONE not capable for hill-hold, can only provide hill-hold assist |
| HH 4: Parallel 3 | Battery SOC ok |
|  | ERAD & CISG max temperatures not reached |
|  | ERAD & CISG together not ALONE capable for hill-hold, can only provide hill-hold assist. Most likely a severe road grade condition |
| HH 5: Series | Battery SOC below allowable limit (need to start engine) |
|  | CISG & ERAD temperatures ok |
|  | ERAD has torque capability of meeting torque for vehicle hill-hold if powered by engine. |
| HH 6 : Electric 1 | Battery SOC ok |
|  | CISG max temperature reached, ERAD temp ok |
|  | ERAD available max torque capable of meeting torque for vehicle hill-hold |
| HH 7: Electric 2 | Battery SOC ok |
|  | CISG temp ok |
|  | CISG available max torque capable of meeting torque for vehicle hill-hold |
| HH 8: Electric 3 | ERAD & CISG max temperatures not reached |
|  | CISG alone not capable of meeting hill-hold torque |
|  | CISG + ERAD available max torques are capable of meeting torque for vehicle hill-hold |
| HH 9: Parallel 4 | Battery SOC below allowable limit (need to start engine) |
|  | ERAD & CISG max temperatures not reached |
|  | ERAD ALONE does not have torque capability of meeting torque for vehicle hill-hold, can only provide hill-hold assist |
|  | Reduces clutch load by splitting engine power to also power ERAD for hill-hold. |
| HH 10: Engine w/ charging | Battery SOC below allowable limit (need to start engine) |
|  | ERAD max temperature reached, CISG temp ok |
|  | Can only use engine for vehicle hill-hold & charging battery through CISG |

FIG. 14 is a flowchart that represents the hill-hold control algorithm applied to controlling powertrain 10. At step 100, the strategy is entered, provided need to hill-hold a vehicle in a stationary condition on an incline is indicated. At step 102 a test is made to determine whether the battery SOC is greater than a reference level. If the result of test 102 is logically true, indicating that the battery's SOC is sufficiently high for use in supplying electric power to CISG 16 and/or ERAD 20 for hill-holding, control passes to step 104. If the result of test 102 is false, indicating that the SOC is too low, control advances to step 106.

At 104, a test is made to determine whether the temperature of a CISG 16 is less than a reference temperature. If the result of test 104 is true, control passes to 108, where a test is made to determine if CISG 16 has sufficient torque capability to meet the hill-hold torque requirement. If the result of test at 108 is true, indicating that CISG 16 temperature is low and the CISG torque capability can meet the required hill-hold torque, control passes to 110, where the seventh mode is actuated, in which the CISG drives wheel 32, 33 through transmission 14, and battery 42 supplies electric power to the CISG.

If the result of test 112 is true, indicating that ERAD temperature is low and CISG 16 is overheated, control passes to 114, where a test is made to determine whether ERAD 20 has sufficient torque capability to meet the required hill-hold torque. If the result of test at 114 is true, indicating that the CISG 16 is not available, ERAD temperature is low, and ERAD torque capability is adequate, control passes to 116 where the hill-hold strategy actuates the sixth mode, in which ERAD 20 drives wheels 34, 35 through ERAD gearing 48 and final drive 36, and battery 42 supplies electric power to the ERAD.

If the result of test 112 is false, indicating that both CISG 16 and ERAD 20 have reached their thermal limits and cannot be used for hill-holding, control passes to 128 where the first mode is actuated, in which engine 12 alone drives wheels 32, 33 by transferring torque through the subject input clutch 38,39 in transmission 14.

If the result of 114 is false, indicating that CISG is not available and that ERAD 20 alone is not capable of producing the required torque for hill-holding, control passes to 130 where the second mode is actuated, in which the engine 12 and the ERAD 20 drive the vehicle wheels 32-35.

If the result of test 108 is false, indicating that the temperature of CISG 16 is low, but the CISG does not have sufficient torque capability to meet the hill-hold requirement, control passes to 118 where a test is made to determine whether the temperature of ERAD 20 is below the reference temperature.

If the result of test 118 is true, indicating that the temperatures of the CISG and ERAD are low, control passes to 120 where a test is made to determine whether the combined torque capabilities of the CISG and ERAD are able to meet the hill-hold torque requirement. If the result of test 120 is true control passes to 122, where the hill-hold strategy the eighth mode is executed and the wheels 32-35 are driven by the CISG and ERAD while the engine is shutdown and the transmission is engaged.

If the result of test 120 is false, indicating that the combined torque capability of the CISG and ERAD are not able to provide the hill-hold torque requirement, control passes to 124 where the fourth hill-hold mode is actuated, wherein engine 12 and CISG 16 drive the vehicle wheels 32, 33 through the transmission 14 and ERAD 20 drives the vehicle wheels 34, 35.

If the results of test 118 is false, indicating that ERAD 16 has reached its thermal limit, the temperature of CISG 16 is low but the CISG is not capable of producing the hill-hold torque requirement, control passes to 126, where the third mode is actuated, in which engine 12 and CISG 16 drive the vehicle wheels 32, 33 by transferring torque through the subject input clutch 38, 39 in transmission 14.

If the result of test 106 is true, indicating that the battery's SOC is low and the temperatures of CISG 16 and ERAD 20 are low, control passes to 132, where a test is made to determine whether the ERAD 20 has sufficient torque capability of meeting the hill-hold torque requirement.

If the result of test 132 is true, indicating that the battery's SOC is low and the torque capability of ERAD 20 when supplied with electric power is capable of meeting the hill-hold requirement, control passes to 134, where the fifth hill-hold mode is actuated, in which the engine 12 drives CISG operating as an electric generator and supplying electric power to the battery 42 or ERAD 20 or both, and the ERAD drives the vehicle wheels 34, 35 to provide the required hill-hold torque.

If the result of test 132 is false, indicating that the battery's SOC is low and the ERAD alone is not able to meet the hill-hold torque requirement, control passes to 136, where the ninth hill-hold mode is actuated, in which a portion of the power produced by engine 12 drives wheels 32 and 33 by transferring torque through the subject input clutch 38, 39 in transmission 14, and the residual portion of the engine's output drives the CISG operating as a generator to supply electric power to the battery or ERAD 20 or both, and the ERAD drives the wheels 34 and 35. In this hill-hold mode, the engine is used to assist the ERAD in providing vehicle hill-hold while charging the battery 42 as necessary.

If the result of the test 106 is false, indicating that either the CISG or ERAD or both have reached their thermal limits, control passes to 138 where a test is made to determine whether the temperature of the CISG is below its reference temperature.

If the result of test 138 is true, indicating that the battery's SOC is low, the temperature of CISG 16 is low, but ERAD 20 has reached its thermal limit, control passes to 140 where the tenth mode is actuated, in which a portion of the power produced by engine 12 drives wheels 32 and 33 by transferring torque through the subject input clutch 38, 39 in transmission 14, and the residual portion of the engine's output drives the CISG operating as a generator to supply electric power to the battery.

If the result of test 138 is false, indicating that the battery's SOC is low and CISG 16 has reached its thermal limit, control passes to 128 where the first mode is actuated, in which the engine alone drives wheels 32, 33 by transferring torque through the subject input clutch 38, 39 in transmission 14.

Figure 15:
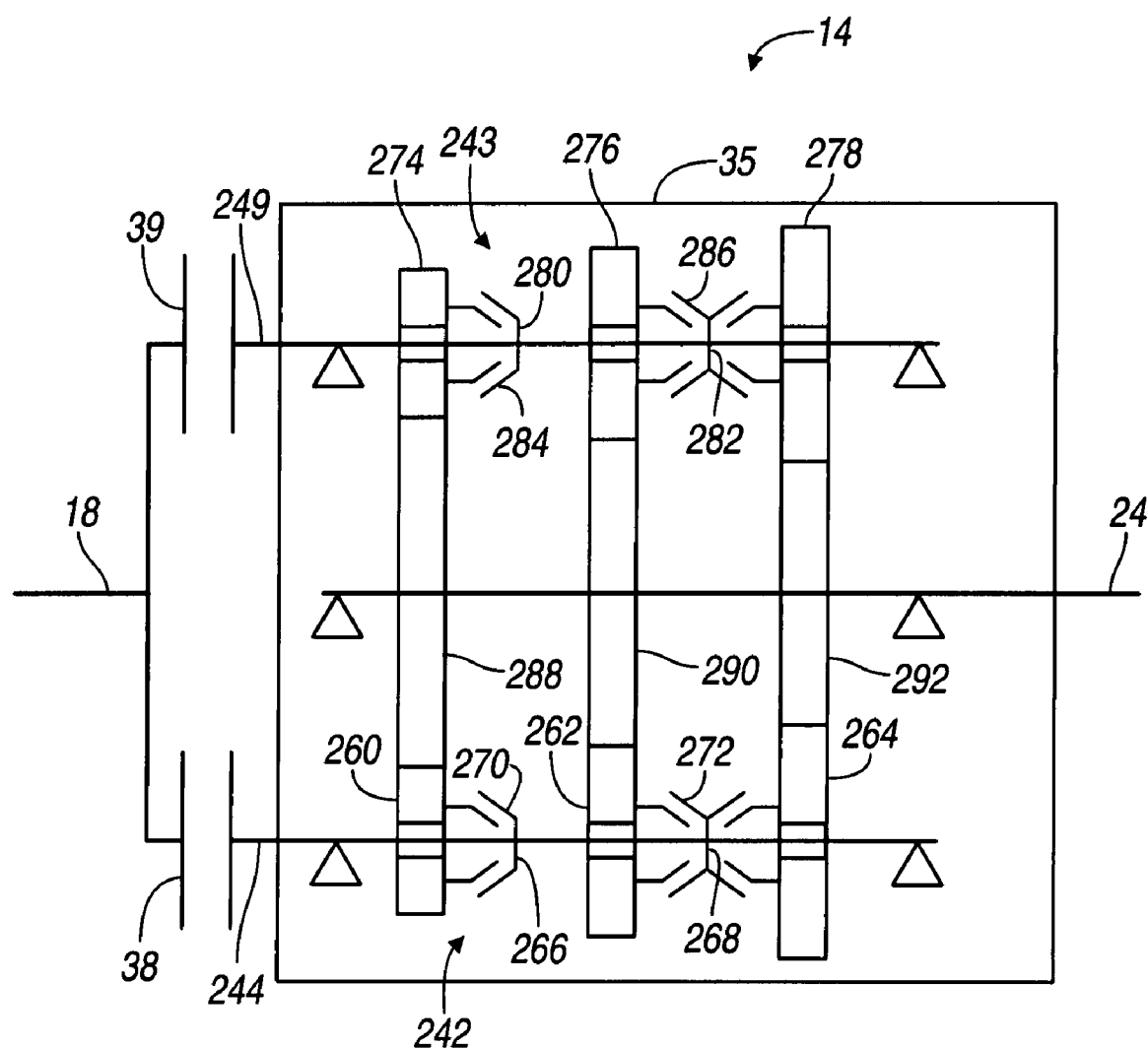
FIG. 15 is a schematic diagram showing details of a powershift transmission.

FIG. 15 illustrates details of a powershift transmission 14 that includes the first input clutch 38, which selective connects the input 18 of the transmission alternately to the even-numbered gears 242 associated with a first layshaft 244, and a second input clutch 39, which selective connects the input 18 alternately to the odd-numbered gears 243 associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 24 supports gears 288, 290, 292, which are each secured to shaft 24. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these.

A unique aspect of the control strategy takes advantage of fully engaging the transmission during engine shutdown so that CISG 16 and the torque multiplication provided by transmission 14 can be used for vehicle hill-hold. This capability is provided in the seventh and eighth hill-hold modes, wherein the motor torque required to hold the vehicle on an incline can be reduced compared to using ERAD 20 directly for hill-hold since the CISG is connected to the transmission input and its torque will be amplified by the transmission gear ratio. Furthermore, since the torque required from the electric machines is reduced, the rate of motor temperature increase will be reduced, thereby maximizing the length of the hill-hold period. Moreover, on severe road grades when the engine is shutdown, the eighth hill-hold mode can be used to provide maximum hill-holding capability compared to using the ERAD only, as in the sixth mode 6. In the fourth hill-hold mode, the control can shift hill-hold assistance between the ERAD and CISG to limit the rate of their temperature increase. For example, when the temperature limit of the ERAD is reached, more torque can be produced by the engine and CISG, and when the temperature limit of the CISG or temperature limit of the subject input clutch 38, 39 is reached, more torque can be produced by the ERAD.

The control strategy also takes advantage of the series mode of operation by using the fifth mode, which can be used when the battery SOC is low while the ERAD's torque capability is sufficient to meet the required hill-hold torque. This allows the engine power to be utilized for vehicle hill-hold while keeping the transmission fully disengaged, hence increasing clutch life. In the second, fourth, and ninth hill-hold modes, the amount of torque to be transferred by the subject input clutch 38, 39 can be reduced by using the ERAD to assist in meeting the required hill-hold torque. In these conditions, the clutch life is increased since less torque is transferred while slipping the clutch. Furthermore, since there are multiple hill-hold operating modes and torque actuators, the control strategy can provide continuous vehicle hill-hold during transitions between the HEV powertrain operating modes such as an engine start condition. During an engine start condition when the vehicle is hill-holding, the ERAD can be used to temporarily provide hill-hold until the engine is started. Finally, the control strategy provides vehicle hill-hold capability while meeting the charging needs of the battery by utilizing hill-hold modes 5, 9, and 10.

In accordance with the provisions of the patent statutes, the preferred embodiment has been described. However, it should be noted that the alternate embodiments can be practiced otherwise than as specifically illustrated and described.

What is claimed is:

1. A method for controlling a vehicle powertrain to hold the vehicle stationary on a grade, comprising the steps of:
   (a) if a state of charge of a battery is lower than a reference, and temperature of a first and a second electric machine is higher than a respective reference temperature, using an engine to produce torque required to hold the vehicle;
   (b) if the state of charge is higher than the reference, and neither machine alone can produce said torque, using the engine in combination with the machines if the temperature of the first and second machines is lower than the reference temperature to produce said torque; and
   (c) if the state of charge is higher than the reference, one of the machines can produce said torque, and temperature of said one of the machines is lower that its reference temperature, using said one of the machines to produce said torque.

2. The method of claim 1, further comprising the steps of:
   determining that the temperature of the first machine is lower than its reference temperature and the temperature of the second machine is lower than its reference temperature;
   using the engine to drive the first machine;
   operating the first machine as a generator to supply electric power to the second machine;
   using the second machine to drive the wheels and produce the required torque at the wheels.

3. The method of claim 1, further comprising the steps of:
   determining that the state of charge is lower that the reference;
   determining that the temperature of the first machine is lower than its reference temperature and the temperature of the second machine is lower than its reference temperature;
   operating the first machine as a generator to supply electric power to the second machine;
   using the engine to drive the first machine and to produce a first portion of said torque at the wheels; and
   using the second machine to drive the wheels and produce a second portion of said torque at the wheels.

4. The method of claim 1, wherein step (d) further comprises the steps of:
   determining that the temperature of the first machine is lower than its reference temperature and the temperature of the second machine is high higher than its reference temperature;
   operating the first machine as a generator to charge the battery; and
   using the engine to drive the first machine and to produce said torque at the wheels.

5. A method for controlling a vehicle powertrain to hold the vehicle stationary on a grade, comprising the steps of:
   (a) if a state of charge of a battery is lower than a reference, and temperature of a first and a second electric machine is higher than a respective reference temperature, using an engine to produce torque required to hold the vehicle;
   (b) if the state of charge is higher than the reference, and neither machine alone can produce said torque, using the engine in combination with the machines if the temperature of the first and second machines is lower than the reference temperature to produce said torque;
   (c) if the state of charge is higher than the reference, one of the machines can produce said torque, and temperature of said one of the machines is lower that its reference temperature, using said one of the machines to produce said torque;
   (d) determining that the state of charge is lower than the reference;
   (e) determining that the first machine can produce said torque at the wheels in combination with the second machine;
   (f) determining that the temperature of the first machine is-lower than its reference temperature and the temperature of the second machine is lower than its reference temperature; and
   (g) using the first machine and the second machine concurrently to drive the wheels and produce said torque at the wheels.

6. A method for controlling a vehicle powertrain to hold the vehicle stationary on a grade, comprising the steps of:
   (a) if a state of charge of a battery is lower than a reference, and temperature of a first and a second electric machine is higher than a respective reference temperature, using an engine to produce torque required to hold the vehicle;
   (b) if the state of charge is higher than the reference, and neither machine alone can produce said torque, using the engine in combination with the machines if the temperature of the first and second machines is lower than the reference temperature to produce said torque;
   (c) if the state of charge is higher than the reference, one of the machines can produce said torque, and temperature of said one of the machines is lower that its reference temperature, using said one of the machines to produce said torque; and
   (d) using the engine in combination with the first machine if the temperature of the first machine is lower than the respective reference temperature, or the second machine if the temperature of the second machine is lower than the respective reference temperature, or both machines if the temperature of the first machine is lower than the respective reference temperature and the temperature of the second machine is lower than the respective reference temperature, to produce said torque.

\* \* \* \* \*